United States Patent
Richards et al.

(10) Patent No.: US 9,522,680 B2
(45) Date of Patent: Dec. 20, 2016

(54) VEHICLE DRIVELINE CONTROL SYSTEM AND METHOD, AND MOTOR VEHICLE COMPRISING SUCH A SYSTEM

(71) Applicant: Jaguar Land Rover Limited, Whitley Coventry Warwickshire (GB)

(72) Inventors: Karl Richards, Leamington Spa (GB); Simon Owen, Redditch (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/891,642

(22) PCT Filed: Apr. 15, 2014

(86) PCT No.: PCT/EP2014/057603
§ 371 (c)(1),
(2) Date: Nov. 16, 2015

(87) PCT Pub. No.: WO2014/183947
PCT Pub. Date: Nov. 20, 2014

(65) Prior Publication Data
US 2016/0082973 A1    Mar. 24, 2016

(30) Foreign Application Priority Data

May 16, 2013 (GB) .................................. 1308805.9

(51) Int. Cl.
*B60W 30/18* (2012.01)
*B60T 8/175* (2006.01)
(Continued)

(52) U.S. Cl.
CPC .... *B60W 30/18172* (2013.01); *B60K 23/0808* (2013.01); *B60T 8/175* (2013.01);
(Continued)

(58) Field of Classification Search
CPC ............ B60W 30/18172; B60W 10/14; B60W 10/184; B60W 2510/182; B60W 2520/263; B60W 2550/148; B60W 210/027; B60K 23/0808; B60K 17/348; B60K 17/35; B60K 2023/0816; B60T 8/175; B60T 2270/202
(Continued)

(56) References Cited

U.S. PATENT DOCUMENTS 4,671,373 A    6/1987 Sigl
4,745,987 A    5/1988 Buschmann
(Continued)

FOREIGN PATENT DOCUMENTS

EP        0963892 A2    6/1999
GB        2161880 A     1/1986
(Continued)

OTHER PUBLICATIONS

International Search Report for application No. PCT/EP2014/057603 dated Nov. 5, 2014, 5 pages.
(Continued)

*Primary Examiner* — McDieunel Marc
*Assistant Examiner* — James E Stroud
(74) *Attorney, Agent, or Firm* — Reising Ethington P.C.

(57) ABSTRACT

A control system for a vehicle operable to control a driveline of a vehicle to vary and amount of torque coupling between first and second groups of one or more wheels, the control system being operable automatically to cause application of brake torque to a wheel of the first or second groups of one or more wheels in response to detection of loss of traction of one or more wheels, wherein if the amount of brake torque or brake pressure of a braking system employed to apply the brake torque exceeds a threshold value in response to the detection of loss of traction, the control system is operable to cause the driveline to reduce the amount of torque coupling between the first and second groups of wheels.

10 Claims, 2 Drawing Sheets

(51) Int. Cl.
  *B60W 10/14* (2012.01)
  *B60W 10/184* (2012.01)
  *B60K 23/08* (2006.01)
  *B60K 17/348* (2006.01)
  *B60K 17/35* (2006.01)

(52) U.S. Cl.
  CPC .......... *B60W 10/14* (2013.01); *B60W 10/184* (2013.01); *B60K 17/348* (2013.01); *B60K 17/35* (2013.01); *B60K 2023/0816* (2013.01); *B60T 2270/202* (2013.01); *B60W 2510/182* (2013.01); *B60W 2520/263* (2013.01); *B60W 2550/148* (2013.01); *B60W 2710/027* (2013.01)

(58) Field of Classification Search
  USPC .......................................................... 701/41
  See application file for complete search history.

(56) References Cited

U.S. PATENT DOCUMENTS

| | | | |
|---|---|---|---|
| 4,770,266 | A | 9/1988 | Yamaguchi et al. |
| 5,119,900 | A | 6/1992 | Watanabe et al. |
| 6,189,643 | B1 | 2/2001 | Takahashi et al. |
| 9,120,478 | B2 * | 9/2015 | Carlson |
| 2003/0130782 | A1 | 7/2003 | Check et al. |
| 2013/0073159 | A1 | 3/2013 | Foret et al. |
| 2014/0041625 | A1 * | 2/2014 | Pirjaberi ................. F02D 41/00 123/349 |
| 2014/0045652 | A1 * | 2/2014 | Carlson ................. B60W 10/06 477/109 |
| 2014/0358400 | A1 * | 12/2014 | Whitney ............. B60W 10/198 701/102 |
| 2015/0203115 | A1 * | 7/2015 | Fairgrieve ............. B60W 50/14 701/93 |

FOREIGN PATENT DOCUMENTS

| | | |
|---|---|---|
| GB | 2414525 A | 11/2005 |
| JP | 6243326 A | 2/1987 |
| JP | H09290655 A | 11/1997 |
| JP | 2011131618 A | 7/2011 |

OTHER PUBLICATIONS

Combined Search and Examination Report for corresponding application No. GB 1308805.9, dated Nov. 18, 2013, 4 pages.

Written Opinion for application No. PCT/EP2014/057603 dated Nov. 5, 2014, 9 pages.

English Summary of Japanese Office Action for application No. JP2016513264, dated Nov. 8, 2016, 2 pages.

* cited by examiner

VEHICLE DRIVELINE CONTROL SYSTEM AND METHOD, AND MOTOR VEHICLE COMPRISING SUCH A SYSTEM

FIELD OF THE INVENTION

The present invention relates to a system, to a motor vehicle including such a system and to a method of controlling a motor vehicle. In particular but not exclusively the invention relates to systems for motor vehicles such as all-terrain vehicles (ATVs) having a driveline that is operable to change the number of wheels that provide torque to drive the vehicle. Aspects of the invention relate to a system, to a vehicle and to a method.

BACKGROUND

It is known to provide a motor vehicle having two pairs of wheels each of which may be driven when a driveline of the vehicle is set to a four wheel drive mode of operation. Some vehicles are arranged such that motive power is permanently supplied to both pairs of wheels. Other vehicles may be arranged such that motive power is selectively supplied to either only one pair of wheels (in a two wheel drive mode of operation) or to both pairs of wheels (in a four wheel drive mode of operation). Some such systems allow the portion of the driveline arranged to transmit power to the second pair of wheels to come to rest when in the two wheel drive mode thereby reducing parasitic losses.

GB2407804 discloses a dynamic driveline reconnect arrangement in which reconnection of two of the wheels to the driveline following disconnection of the wheels from the driveline may be undertaken when the vehicle is moving. Such a system may be referred to as a dynamic driveline reconnect (or disconnect) system. The system disclosed in GB2407804 employs clutch arrangements to enable dynamic driveline reconnection.

It is an aim of embodiments of the present invention to provide an improved control system for a motor vehicle.

STATEMENT OF THE INVENTION

Embodiments of the present invention may be understood by reference to the appended claims.

In one aspect of the invention for which protection is sought there is provided a control system for a vehicle operable to control a driveline of a vehicle to vary an amount of torque coupling between first and second groups of one or more wheels, the control system being operable automatically to cause application of brake torque to a wheel of the first or second groups of one or more wheels in response to detection of loss of traction of one or more wheels,
wherein if the amount of brake torque or brake pressure of a braking system employed to apply the brake torque exceeds a threshold value in response to the detection of loss of traction, the control system is operable to cause the driveline to reduce the amount of torque coupling between the first and second groups of wheels.

Embodiments of the present invention have the advantage that degradation of a driving surface that may be caused by transmission of brake torque from a wheel of one group to a wheel of the other group via the driveline may be prevented. However, the present applicant has recognised that for sufficiently low values of brake torque or brake pressure, the amount of torque transferred by the driveline between the first and second groups when braking is applied to a wheel of one group may be sufficiently low that it does not cause significant surface degradation, if at all. Since a change in vehicle handling characteristics may be observed when a reduction in in the amount of coupling is made, it is preferable not to reduce the coupling between the groups. Accordingly, embodiments of the present invention may enhance driver confidence in vehicle handling by triggering a reduction in coupling between the groups of wheels only in the event that the amount of brake torque or brake pressure exceeds the threshold value.

It is to be understood that in some embodiments, the reduction in coupling may be commanded in dependence on brake torque exceeding a threshold value, and not brake pressure. This feature may be useful in vehicles not having a pressure-controlled braking system, for example in vehicles employing regenerative braking systems or the like to apply the brake torque. Thus the system may monitor brake torque and trigger a transition to the first mode when brake torque exceeds the threshold value.

In some alternative embodiments, the transition to the first mode may be commanded in dependence on brake pressure exceeding a threshold, and not in respect of brake torque.

Thus, it is to be understood that brake torque may be applied by means of a foundation braking system that may include friction braking capability and/or regenerative braking capability. Regenerative braking capability may be implemented in some embodiments by means of an electric machine operated as an electrical generator.

Embodiments of the present invention are applicable to conventional vehicles powered by an internal combustion engine, to hybrid vehicles having an internal combustion and one or more electric propulsion motors and to electric vehicles.

The threshold value may be set in dependence on the substantially instant amount of coupling between the first and second groups of wheels.

In the event the coupling is such that the first and second groups of wheels are relatively strongly coupled, for example by means of a power transfer unit and rear drive unit each of which are in a substantially fully closed condition, the amount of the reduction in coupling may be relatively large. Thus, in some embodiments the first and second groups may be substantially fully decoupled from one another when brake torque or brake pressure above the threshold value is detected in response to the detection of loss of traction. Loss of traction may be determined to have occurred when for example an event is detected in which a dynamic stability control system (DSC) system is triggered (or 'intervenes') to apply brake torque to one or more wheels. This may be referred to as a 'DSC intervention event'. It is to be understood that in known DSC systems, a DSC controller typically commands application of brake torque to a wheel of a given axle on only one side of the vehicle in order to induce corrective yaw of the vehicle to maintain an intended path of travel.

The system may be operable to substantially decouple the first and second groups of wheels from one another in response to the detection of loss of traction.

The driveline may be operable in a first mode in which the first group of one or more wheels and not the second group is arranged to be driven by prime mover means and a second mode in which the first and second groups are coupled such that the first group and in addition the second group is arranged to be driven by the prime mover means, wherein if the driveline is in the second mode of operation and brake torque or brake pressure of the braking system exceeds the threshold value in response to the detection of loss of traction, the control system is operable to cause the driveline to assume the first mode of operation.

It is to be understood that some known vehicle drivelines are switchable between first and second modes of operation such that when in the second mode the first and second groups of wheels are coupled to one another. Application of brake torque to one wheel only of one group of wheels may result in torque transfer via the driveline to a wheel of the other group.

It is to be understood that, in order for the driveline to be in the first mode or the second mode of operation, drive torque need not necessarily be being applied continuously.

Importantly, in the first mode, the driveline is arranged such that the first group of one or more wheels and not the second group are arranged to be driven by the prime mover means when the prime mover means develops drive torque. Thus, in the case of a vehicle having an internal combustion engine that may be decoupled from the driveline by means of a clutch, the driveline may still be considered to be in the first mode of operation if it is in a condition in which the clutch is open, provided it is in a condition in which if the engine is running and the clutch is closed, only the first group of one or more wheels are driven by the engine.

The system may be operable to select the threshold value of brake torque or brake pressure in dependence on one or more vehicle parameters.

The one or more vehicle parameters may include a value of surface coefficient of friction between a wheel and a driving surface.

The system may be operable in one of a plurality of respective driving modes, in each driving mode the system being arranged to control one or more vehicle subsystems to operate in one of a plurality of subsystem configuration modes, the system being operable to select the threshold value of brake torque or brake pressure in dependence on the selected driving mode.

The system may be operable to allow a user to select the driving mode in which the control system is to operate.

The system may be operable to select automatically the driving mode in which the control system is to operate.

The system may comprise a dynamic stability control (DSC) system, the DSC system being configured to command application of the brake torque or brake pressure in response to the detection of loss of traction.

The DSC system may be a conventional DSC system of known type. The control system may monitor a 'DSC intervention' signal generated by the DSC system indicating the DSC system is commanding application of brake torque to reduce vehicle instability. In the event the control system detects the DSC intervention signal, the control system may command reduction in coupling between the first and second groups of one or more wheels in dependence on the amount of brake torque or brake pressure exceeds the threshold value.

In an aspect of the invention for which protection is sought there is provided a motor vehicle comprising a system according to a preceding aspect.

In one aspect of the invention for which protection is sought there is provided a method of controlling a vehicle having a driveline operable to vary an amount of torque coupling between first and second groups of one or more wheels, the method comprising automatically causing application of brake torque to a wheel of the first or second groups of one or more wheels in response to detection of loss of traction of one or more wheels, whereby if the amount of brake torque or brake pressure of a braking system employed to apply brake torque exceeds a threshold value in response to the detection of loss of traction, the method comprises causing the driveline to reduce the amount of torque coupling between the first and second groups of wheels.

In an aspect of the invention for which protection is sought there is provided a control system for a vehicle operable to cause a driveline of the vehicle to operate in one of a first and a second driveline mode, wherein in the first mode a first group of one or more wheels of the vehicle is arranged to be driven by prime mover means and in the second mode the first and in addition a second group of one or more wheels are arranged to be driven by the prime mover means, the control system being operable automatically to cause application of brake torque to one or more wheels of the first or second groups of one or more wheels in response to detection of loss of traction of one or more wheels, wherein if the driveline is in the second mode of operation and brake torque or brake pressure exceeding a threshold value is applied in response to the detection of loss of traction, the control system is operable to cause the driveline to assume the first mode of operation.

In a further aspect of the invention there is provided a method of controlling a vehicle having first and second groups of one or more wheels comprising:

controlling a driveline of the vehicle to operate in a second mode of operation in which the first and second groups of one or more wheels are arranged to be driven by prime mover means; and automatically causing application of brake torque to a wheel of the first or second groups of one or more wheels in response to the detection of loss of traction of one or more wheels, whereby if the driveline is in the second mode of operation and brake torque or brake pressure exceeding a threshold value is applied in response to the detection of loss of traction, the control system is operable to cause the driveline to assume a first mode of operation in which the first group of wheels and not the second group of wheels are arranged to be driven by the prime mover means.

It is to be understood that in some embodiments, the control system may be operable to decouple front and rear axles of the vehicle when the axles are coupled (for example when the vehicle is in second mode of operation) in the event that a differential in brake pressure or brake torque applied between respective left and right hand wheels of an axle in consequence of a detection of loss of traction exceeds a prescribed value. Other arrangements are also useful.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
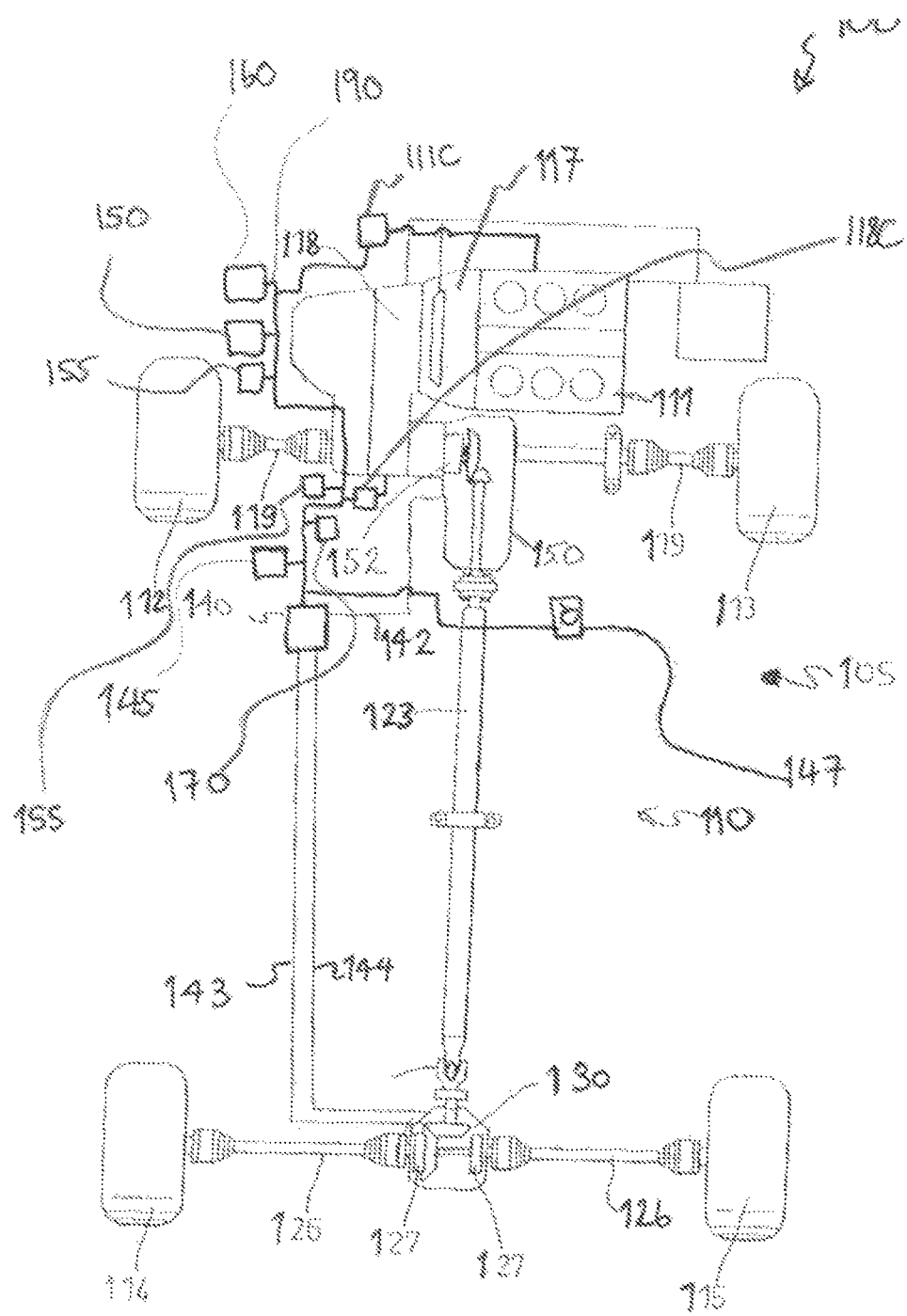
FIG. 1 is a schematic illustration of a portion of a vehicle according to an embodiment of the present invention.

FIG. 1 shows a portion of a motor vehicle 100 according to an embodiment of the present invention. The vehicle 100 has a driveline 105 that is connected to an internal combustion engine 111 by means of a transmission 118. The driveline 105 has a pair of front wheels 112, 113, an auxiliary driveline portion 110 and a pair of rear wheels 114, 115. The auxiliary driveline portion 110 forms part of the driveline 105, but may also be referred to as an 'auxiliary driveline 110'. Its purpose is to convey drive torque to rear wheels 114, 115 of the vehicle 100 when required.

The engine 111 is controlled by an engine controller 111C whilst the transmission 118 is controlled by a transmission controller 118C. A suspension controller 155 is provided for controlling a stiffness and a ride height of a suspension of the vehicle 100.

The driveline 105 is arranged selectively to transmit power from the internal combustion engine 111 to the front wheels 112, 113 of the vehicle 100 only (in a first mode of operation also referred to as a two wheel drive mode of operation) or to the front wheels 112, 113 and the rear wheels 114, 115 simultaneously (in a second mode of operation also referred to as a four wheel drive mode of operation).

Power is transmitted from the internal combustion engine 111 to the front wheels 112, 113 by means of a clutch 117, the gearbox 118 and a pair of front drive shafts 119.

Power is transmitted to the rear wheels 114, 115 by means of the auxiliary driveline portion 110. The auxiliary driveline portion 110 has a power transfer unit (PTU) having releasable torque transmitting means in the form of a power transfer clutch (PTC) 152 operable to connect a drive shaft or prop shaft 123 of the auxiliary driveline 110 to the gearbox 118. The drive shaft 123 may also be referred to as an auxiliary drive shaft 123.

The PTC 152 is in the form of a multi-plate wet clutch (MPG). An electromechanical actuator (not shown) is arranged to open and close the PTC 152.

The auxiliary drive shaft 123 is coupled in turn to a rear drive unit (RDU) 130 operable to couple the auxiliary drive shaft 123 to a pair of rear drive shafts 126. The RDU 130 has releasable torque transmitting means in the form of a pair of clutches 127 actuated by respective electromechanical actuators (not shown). The RDU 130 is thereby operable to connect the auxiliary draft shaft 123 to the rear drive shafts 126 when the four wheel drive mode of operation is required. When the clutches 127 are closed, the RDU 130 accommodates differential rates of rotation of the rear wheels 114, 115 by slippage of one or both of the clutches 127.

The driveline 105 has a driveline controller 140 arranged to control operation of the actuators of the PTC 152 and clutches 127. A PTC power cable 142 provides power from the controller 140 to the actuator of the PTC 152 whilst left and right actuator power cables 143, 144 respectively power left and right actuators of the RDU 130.

When a four wheel drive mode of operation is required the controller 140 is arranged to power the actuator of the PTC 152 to close the PTC 152 and to power the actuators of the clutches 127 of the RDU 130 to close the clutches 127.

A vehicle control unit (VCU) 145 is provided that is operable to command the driveline controller 140 to control the driveline to assume the two wheel drive or four wheel drive modes of operation as required.

It is to be understood that when the driveline 105 is in the second mode of operation the first and second pairs of wheels 112, 113, 114, 115 are mechanically coupled such that torque transfer can take place between wheels of the first pair and wheels of the second pair if a brake is applied to one or both wheels of the first and second pair whilst the vehicle is moving.

The vehicle is also equipped with a dynamic stability control (DSC) system controller 150, an antilock braking system (ABS) controller 160, the suspension controller 155 and a steering controller 170. The driveline controller 140, VCU 145, DSC system controller 150, ABS controller 160 and steering controller 170 are in communication with one another via a controller area network (CAN) bus 190.

It is to be understood that the VCU 145 is configured to implement a known terrain response (TR)® function of the type disclosed in U.S. Pat. No. 7,349,776, the content of which is hereby incorporated reference. The driving modes may also be referred to as terrain response (TR) modes. The VCU 145 controls settings of the engine controller 111C, ABS controller 160, driveline controller 145, steering controller 170, transmission controller 118C, DSC system controller 150 and suspension controller 155 in dependence on the selected driving or TR mode.

Each of the driving modes corresponds to a particular driving condition or set of driving conditions, and in each driving mode settings of each of the controllers 111C, 160, 145, 170, 118C, 150, 155 are set in a manner most appropriate to those conditions. The conditions are linked to types of terrain over which the vehicle may be driven. The driving modes include a grass/gravel/snow (GGS) terrain mode, a mud and ruts (MR) terrain mode, a rock crawl (RC) terrain mode, a sand (SAND) terrain mode and a highway mode known as 'special programs off' (SPO).

The driving mode may be selected by a user by means of a driving mode selector dial 147. In addition, the user may select an 'AUTO TR' mode in which the VCU 145 itself determines the most appropriate driving mode. If the user has selected operation of the vehicle in the AUTO TR mode, the VCU 145 selects the most appropriate one of the driving modes and controls settings of the controllers 111C, 160, 145, 170, 118C, 150, 155 according to the selected mode. This aspect of operation of the VCU 145 is described in further detail in our co-pending patent nos. GB2492748 and GB2492655, the contents of each of which is incorporated herein by reference The DSC system controller 150 is operable to monitor a speed of each wheel 112, 113, 114, 115 of the vehicle 100 by reference to wheel speed signals transmitted on the CAN bus 190. The DSC system controller 150 also monitors steering angle via signals transmitted on the CAN bus 190 by the steering controller 170. In addition the DSC system controller 150 monitors both lateral acceleration and yaw of the vehicle 100 by reference to signals transmitted on the CAN bus 190 by a sensor module 155. The sensor module includes accelerometers that are responsive to vehicle lateral acceleration and yaw rate.

The DSC system controller 150 compares intended vehicle direction as determined by reference to the steering angle with the vehicle's actual direction as determined by reference to the speed of individual wheels 112, 113, 114, 115 and measured values of lateral acceleration and yaw rate in a known manner. If the DSC system controller 150 detects loss of traction (i.e. wheel slip) exceeding a prescribed amount in a lateral and/or longitudinal direction the controller 150 is configured to intervene in brake control and to command the ABS controller 160 to apply brake torque to one or more wheels 112, 113, 114, 115 of the vehicle 100 by means of a respective brake of each wheel in order to cause a direction of travel of the vehicle 100 to correspond more closely to the intended direction. The operation of the DSC system controller 150 in this manner is well known.

The ABS controller 160 responds by commanding an increase in brake pressure applied to the brake of one or more wheels according to the command received from the DSC system controller 150.

When the DSC system controller 150 'intervenes' to command application of brake torque the VCU 145 monitors the amount of brake pressure applied by the ABS controller 160. If the driveline 105 is in the four wheel drive mode of operation and the amount of brake pressure exceeds a threshold value, the VCU 145 is configured to command the driveline controller 140 to control the driveline 105 to assume the two wheel drive mode of operation.

This feature results in decoupling of the first and second groups of wheels such that brake torque applied to one or both wheels of the first or second groups of wheels is not transmitted to the other group of wheels. This can prevent a reduction in vehicle stability and improve vehicle handling.

In the present embodiment the threshold value of brake pressure employed by the VCU 145 is determined according to the instant driving mode in which the vehicle 100 is driving. That is, the threshold value applied may be different in one driving mode compared with another driving mode. For example, in the case of driving in a driving mode corresponding to a surface of relatively low surface coefficient of friction such as the GGS mode or MR mode the brake pressure threshold may be lower than in the case of a driving mode corresponding to a surface of relatively high surface coefficient of friction such as the SPO mode. Furthermore, in some embodiments the VCU 145 is configured to determine the threshold value of brake pressure in dependence on a signal indicative of the surface coefficient of friction between the vehicle wheels and the driving surface.

It is to be understood that when the vehicle is driving on a surface of relatively high coefficient of friction, if the DSC system commands the application of relatively low values of brake pressure to brake one or more wheels the amount of torque transmitted from one axle to another via the auxiliary driveline portion 110 will typically not cause unnecessary erosion or degradation of the prevailing terrain and potentially destabilise the vehicle. This is because the unbraked wheels are likely to have sufficient capacity within their tyre friction circle to accommodate the change in torque without suffering excessive slip. In some embodiments, if the value of surface coefficient of friction exceeds a prescribed value, the VCU 145 may be configured not to command a transition to the two wheel drive mode when a DSC event takes place regardless of brake torque or brake pressure. Other arrangements are also useful.

However, where a wheel is driving on a surface of relatively low surface coefficient of friction, even a relatively small amount of brake torque applied by the DSC system may result in torque transfer from one axle to another that may have a destabilising effect on the vehicle.

The driving modes may include a 'dynamic' driving mode. In some embodiments the dynamic mode may be selectable only when the vehicle is in the SPO driving mode. In the dynamic driving mode, the engine controller 111C may be configured to control the engine 111 to provide a more aggressive response to depression of an accelerator pedal of the vehicle. That is, an amount of torque developed by the engine 111 for a given depression of the accelerator pedal over at least a portion of the range of travel of the accelerator pedal may be greater when in the dynamic mode compared with the SPO mode. The transmission controller 118C may also be configured to control the transmission 118 in such a manner as to delay a transition from a lower gear to a higher gear when the vehicle is accelerating so as to facilitate more aggressive acceleration of the vehicle when required. In some embodiments, when the vehicle is in the dynamic driving mode the threshold values of brake torque or brake pressure (depending on the type of braking system fitted to the vehicle) above which the driveline is controlled to assume the two wheel drive mode when in the four wheel drive mode may be increased. Other arrangements are also useful.

Figure 2:
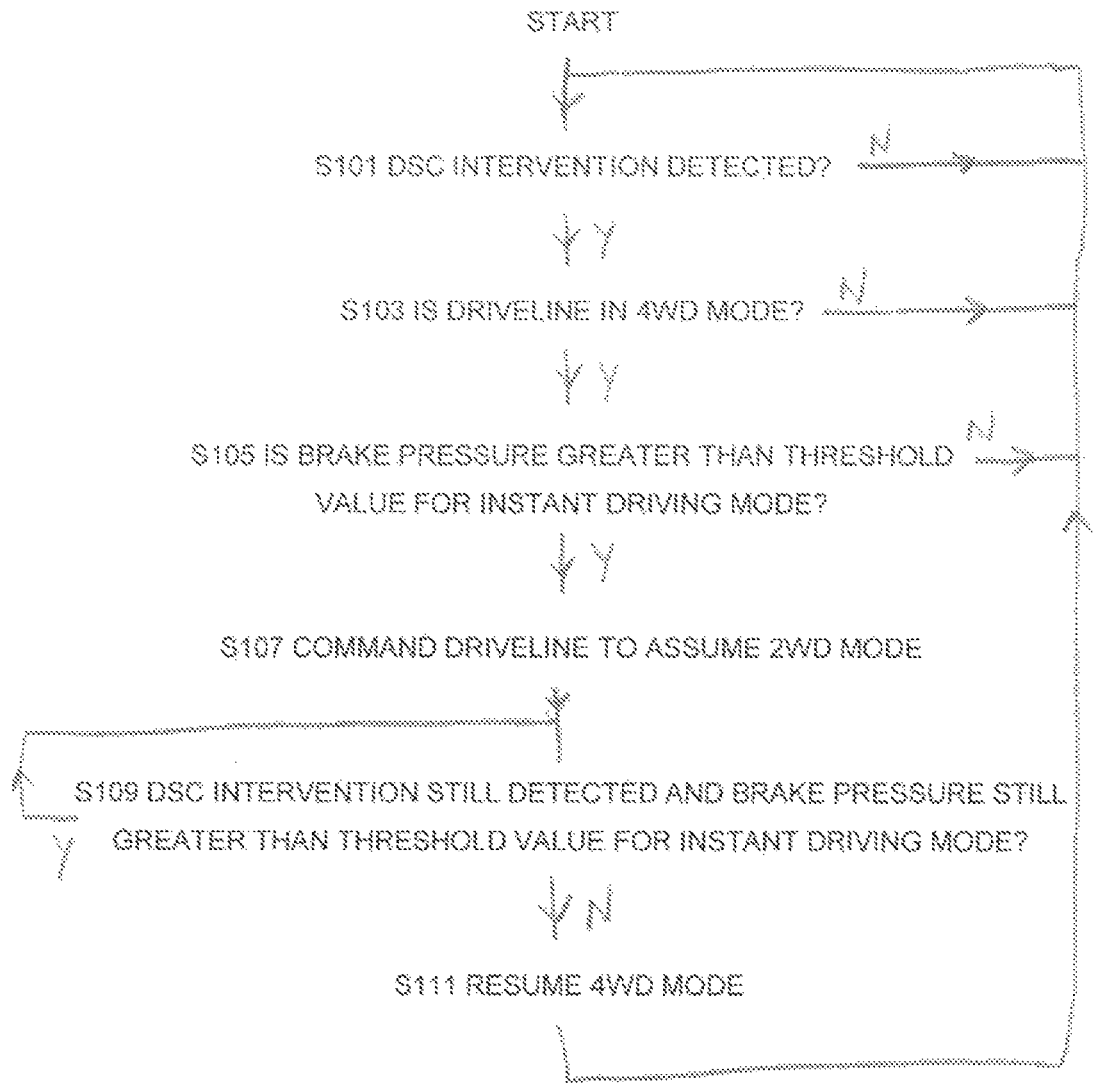
FIG. 2 is a non-limiting flow diagram illustrating operation of a vehicle according to an embodiment of the present invention.

In some embodiments, the VCU 145 may be operable not to command a transition from the four wheel drive mode to the two wheel drive mode of operation in dependence on brake pressure or brake torque when a DSC intervention takes place. Rather, the driveline may remain in the four wheel drive mode. The VCU 145 may be operable not to command the transition to the four wheel drive mode in dependence on a pitch angle and/or roll angle of the vehicle. Thus if the vehicle is ascending or descending a relatively steep slope, or traversing a cross-slope, the VCU 145 may be operable to suspend overriding of the transition to the four wheel drive mode Operation of the vehicle of FIG. 1 will now be described with reference to the flow diagram of FIG. 2.

At step S101 the VCU 145 checks whether a signal transmitted on the CAN bus 190 indicates that the DSC system controller 150 has intervened to trigger application of a brake to one or more wheels of the vehicle 100. If a DSC intervention event is not detected the VCU 145 repeats step S101.

If a DSC intervention event is detected at step S101, the VCU 145 continues at step S103. At step S103 the VCU 145 determines whether the driveline 105 is in the four wheel drive mode of operation. If the driveline 105 is not in the four wheel drive mode the VCU 145 continues at step S101.

If the driveline 105 is in the four wheel drive mode the VCU 145 continues at step S105. At step S105 the VCU 145 determines whether the amount of brake pressure applied to cause braking as a consequence of the DSC intervention event exceeds a prescribed threshold value. In the present embodiment, the prescribed threshold value is determined according to the instant driving mode, the driving mode having been selected by a user by means of the selector 147 or automatically by the VCU 145. If at step S105 it is determined that the applied brake pressure does not exceed the threshold value, the VCU 145 continues at step S101.

If at step S105 it is determined that the applied brake pressure does exceed the threshold value, the VCU 145 continues at step S107.

At step S107 the VCU 145 commands the driveline controller 140 to control the driveline 105 to assume the two wheel drive mode of operation. The VCU 145 then continues at step S109.

At step S109 the VCU 145 determines whether the CAN bus 190 indicates that the DSC system controller 150 is still intervening to trigger application of a brake to one or more wheels of the vehicle 100. If the VCU 145 determines that the DSC controller 150 is no longer intervening the VCU 145 continues at step S111.

At step 111 the VCU 145 commands the driveline controller 140 to control the driveline 105 to resume the four wheel drive mode of operation. The VCU 145 then continues at step S101.

If at step S109 the VCU 145 determines that the DSC system controller 150 is still commanding application of brake torque to one or more wheels and the amount of brake pressure still exceeds the prescribed threshold value for the current vehicle driving mode, the VCU 145 repeats step S109.

In some embodiments, the value of brake pressure above which the VCU 145 commands the driveline controller 150 to control the driveline 105 to assume the two wheel drive mode may be different from the value below which the VCU 145 commands the driveline controller 150 to resume the four wheel drive mode. Thus a hysteresis may be introduced in respect of values of brake pressure triggering the transition to and from the two wheel drive mode in the event of DSC intervention in the four wheel drive mode. In some embodiments the threshold value for resumption of operation in the four wheel drive mode may be lower than that for transitioning to the two wheel drive mode. Other arrangements are also useful.

Embodiments of the present invention have the advantage that a stability of a vehicle may be enhanced when a braking system is triggered automatically at a selected one or more wheels of the vehicle in response to detection of loss of traction. This is because if the vehicle 100 is operating in a four wheel drive mode at the time the braking system is triggered, the driveline may be controlled to assume the two wheel drive mode of operation thereby decoupling front and rear axles of the vehicle from one another such that a torque path no longer exists between the front and rear axles.

In some embodiments, the driveline may be operable to vary the amount of torque transmitted by the auxiliary driveline portion 110 to the rear wheels 114, 115. For example in some embodiments having a driveline similar to that shown in FIG. 1 the amount of pressure applied to clutches 127 to close the clutches 127 may be varied such that the clutches 127 may assume one or more intermediate conditions that are between a fully closed condition (in which maximum clutch pressure is applied) and a fully open condition (in which minimum or substantially zero cutch pressure is applied in some arrangements). The driveline controller 140 may be operable to vary the clutch pressure in dependence on one or more factors such as a rate of acceleration of the vehicle in order to control the extent to which the clutches 127 are closed. For example, for relatively high rates of acceleration the controller 140 may increase the pressure applied to close the clutches 127 in order to increase the amount of torque transmitted to the rear wheels 114, 115, increasing vehicle stability whilst the vehicle 100 is accelerating. The amount of pressure may decrease when acceleration decreases below a threshold in order to allow a user to enjoy improved fuel economy. Other arrangements are also useful.

Some embodiments of the present invention provide a control system for a vehicle that is operable to command a driveline to assume a two wheel drive mode of operation when a DSC intervention event occurs and the amount of brake torque or brake pressure commanded by a DCS controller exceeds a prescribed value. This has the advantage that vehicle stability and composure may be enhanced when a DSC event occurs and the vehicle is in the four wheel drive mode of operation. The transition from the four wheel drive mode to the two wheel drive mode results in decoupling of the front and rear axles of the vehicle and consequently the breaking of a torque path between the axles. The transmission of braking torque between the axles when the DSC controller commands application of torque to a wheel of only one axle may therefore be prevented. For relatively low values of brake torque or brake pressure commanded by the DSC controller, vehicle stability is substantially unaffected if the vehicle remains in the four wheel drive mode. Accordingly, a transition to the two wheel drive mode is only commanded above a prescribed value of brake torque or brake pressure. The prescribed value of brake torque or pressure triggering the transition to the two wheel drive mode is set to a value at or below which the amount of brake torque transmitted between axles whilst in the four wheel drive mode in the event of a DSC intervention would be expected to be sufficiently low not to cause instability of the vehicle. As described above, the threshold value may be different depending on the driving mode and/or coefficient of friction between wheels of the vehicle and the driving surface.

Embodiments of the invention have the advantage that because the transition to the two wheel drive mode is only made when the brake torque or brake pressure exceeds a threshold value, a user is not inconvenienced by the change of handling characteristics when an unnecessary transition to the two wheel drive mode is made in response to DSC intervention.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A system for a vehicle, the system being operable to:
control a driveline of a vehicle to vary an amount of driveline torque coupling between first and second groups of one or more wheels; and
in response to a detection of a loss of traction of one or more wheels cause a stability control system to apply a brake torque to a wheel of the first or second groups of one or more wheels in order to induce a corrective yaw to the vehicle to maintain an intended path of travel;
wherein the system is configured such that, when the brake torque applied and/or a brake pressure of a braking system employed to apply the brake torque exceeds a non-zero threshold value, the system causes the driveline to reduce the amount of driveline torque coupling between the first and second groups of wheels.

2. A system according to claim 1 wherein the threshold value is set in dependence on the substantially instant amount of coupling between the first and second groups of wheels.

3. A system according to claim 1 wherein the driveline is configured in a first mode in which the first group of one or more wheels and not the second group is arranged to be driven by prime mover means and a second mode in which the first and second groups are coupled such that the first group and in addition the second group is arranged to be driven by the prime mover means, and wherein the system is configured such that, when the driveline is in the second mode of operation and brake torque or brake pressure of the braking system exceeds the threshold value in response to the detection of loss of traction, the system causes the driveline to assume the first mode of operation.

4. A system according to claim 1 configured to select the threshold value of brake torque or brake pressure in dependence on one or more vehicle parameters.

5. A system according to claim 4 wherein the one or more vehicle parameters include a value of surface coefficient of friction between a wheel and a driving surface.

6. A system according to claim 1 configured to operate in one of a plurality of driving modes, wherein in each driving mode the system is arranged to control one or more vehicle subsystems to operate in one of a plurality of subsystem configuration modes, the system being configured to select the threshold value of brake torque or brake pressure in dependence on the selected driving mode.

7. A system according to claim 6 configured to allow a user to select the driving mode in which the system is to operate.

8. A system according to claim 6 configured to select automatically the driving mode in which the system is to operate.

9. A motor vehicle comprising a system according to claim 1.

10. A method of controlling a vehicle having a driveline operable to vary an amount of driveline torque coupling between first and second groups of one or more wheels, the method comprising, in response to detection of loss of traction of one or more wheels, automatically causing a stability control system to apply brake torque to a wheel of the first or second groups of one or more wheels in order to induce a corrective yaw to the vehicle to maintain an intended path of travel, whereby the method comprises causing the driveline to reduce the amount of driveline torque coupling between the first and second groups of wheels when an amount of brake torque or brake pressure of a braking system employed to apply brake torque exceeds a non-zero threshold value in response to the detection of loss of traction.

* * * * *